(12) United States Patent
Du et al.

(10) Patent No.: US 12,195,056 B2
(45) Date of Patent: Jan. 14, 2025

(54) UNDERFRAME BOUNDARY BEAM CONNECTING STRUCTURE SUITABLE FOR RAILWAY VEHICLE WITH DRUM-SHAPED VEHICLE BODY

(71) Applicant: CRRC Nanjing Puzhen Co., Ltd., Nanjing (CN)

(72) Inventors: Yanpin Du, Nanjing (CN); Liang Zhu, Nanjing (CN); Yanlin Jiang, Nanjing (CN); Xiaoyu Wang, Nanjing (CN); Yonggang Niu, Nanjing (CN); Qunfa Shan, Nanjing (CN); Sheng Zhang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 779 days.

(21) Appl. No.: 17/598,905

(22) PCT Filed: Nov. 11, 2020

(86) PCT No.: PCT/CN2020/128078
§ 371 (c)(1),
(2) Date: Sep. 28, 2021

(87) PCT Pub. No.: WO2022/062110
PCT Pub. Date: Mar. 31, 2022

(65) Prior Publication Data
US 2022/0315067 A1 Oct. 6, 2022

(30) Foreign Application Priority Data
Sep. 24, 2020 (CN) .......................... 202011013461.4

(51) Int. Cl.
*B61F 1/08* (2006.01)
*B61D 17/04* (2006.01)
(Continued)

(52) U.S. Cl.
CPC ................ *B61F 1/08* (2013.01); *B61D 17/04* (2013.01); *B61D 17/08* (2013.01); *B61D 17/10* (2013.01); *B61F 1/00* (2013.01); *B61F 1/14* (2013.01)

(58) Field of Classification Search
CPC ..... B61F 1/00; B61F 1/08; B61F 1/14; B61D 17/04; B61D 17/08; B61D 17/10
(Continued)

(56) References Cited

U.S. PATENT DOCUMENTS

| | | | |
|---|---|---|---|
| 3,333,552 A | * | 8/1967 | Reynolds .................. B61F 1/00 105/422 |
| 2002/0020325 A1 | * | 2/2002 | MacDonald ........... B62D 33/04 105/355 |

(Continued)

FOREIGN PATENT DOCUMENTS

| | | |
|---|---|---|
| CN | 201907513 U | 7/2011 |
| CN | 204161378 U | 2/2015 |

(Continued)

*Primary Examiner* — Zachary L Kuhfuss
*Assistant Examiner* — James William Jones
(74) *Attorney, Agent, or Firm* — Bayramoglu Law Offices LLC

(57) ABSTRACT

An underframe boundary beam connecting structure suitable for a railway vehicle with a drum-shaped vehicle body is provided. An underframe boundary beam is a through long roll bending piece, a section of the through long roll bending piece is of a channel structure, and has a side face, an upper wing face, and a lower wing face. The side face has an inclination angle consistent with a side wall plate, an upper end of an outer side of the side face is provided with a concave platen, and the side wall plate is lapped on the concave platen and fixed by a butt welding; an inner end of the lower wing face is provided with a downwards vertical (Continued)

flanging, a vertical plate is welded and fixed between the upper wing face and the lower wing face.

20 Claims, 1 Drawing Sheet

(51) Int. Cl.
  *B61D 17/08* (2006.01)
  *B61D 17/10* (2006.01)
  *B61F 1/00* (2006.01)
  *B61F 1/14* (2006.01)

(58) Field of Classification Search
  USPC .................. 105/396, 401, 409, 413, 418
  See application file for complete search history.

(56) References Cited

U.S. PATENT DOCUMENTS

2013/0263757 A1* 10/2013 Rezaei .................. B61D 3/02
  105/355

2018/0043907 A1* 2/2018 Hirashima ............. B61D 17/10

FOREIGN PATENT DOCUMENTS

| | | | | |
|---|---|---|---|---|
| CN | 105329249 A | * | 2/2016 | |
| CN | 104760603 B | * | 9/2017 | ............. B61C 17/00 |
| CN | 107745719 A | * | 3/2018 | ............. B61D 17/06 |
| CN | 107790949 A | | 3/2018 | |
| CN | 207481901 U | | 6/2018 | |
| CN | 104709300 B | * | 8/2018 | ............. B61D 17/08 |
| CN | 108657211 A | | 10/2018 | |
| CN | 109835359 A | | 6/2019 | |
| CN | 110027586 A | | 7/2019 | |
| CN | 209305587 U | | 8/2019 | |
| CN | 109383552 B | | 4/2020 | |
| CN | 111232002 A | | 6/2020 | |
| CN | 111348063 A | * | 6/2020 | ........... B61D 17/043 |
| GB | 701403 A | | 12/1953 | |
| JP | 2004130914 A | | 4/2004 | |
| JP | 2018008600 A | | 1/2018 | |
| KR | 20070097277 A | * | 10/2007 | |
| WO | 2013124962 A1 | | 8/2013 | |
| WO | WO-2014128447 A1 | * | 8/2014 | ............... B61D 7/00 |

* cited by examiner

UNDERFRAME BOUNDARY BEAM CONNECTING STRUCTURE SUITABLE FOR RAILWAY VEHICLE WITH DRUM-SHAPED VEHICLE BODY

CROSS REFERENCE TO THE RELATED APPLICATIONS

This application is the national stage entry of International Application No. PCT/CN2020/128078, filed on Nov. 11, 2020, which is based upon and claims priority to Chinese Patent Application No. 202011013461.4 filed on Sep. 24, 2020, the entire contents of which are incorporated herein by reference.

TECHNICAL FIELD

The invention relates to an underframe boundary beam of a railway vehicle, which is particularly suitable for a railway vehicle with a drum-shaped vehicle body.

BACKGROUND

The conventional railway passenger trains in China have been straight vehicle bodies for many years, adopting the plate beam structure made of carbon steel texture. The underframe boundary beam usually adopts an 18b hot-rolled steel channel, and the mounting of the under-vehicle equipment adopts cross beam hanging. A longitudinal beam and a mounting seat are required to be welded on the underframe of the vehicle provided with the apron board. With the rapid development of high-speed vehicles, the requirements for aerodynamic performance and comfort of vehicles are higher and higher, and the adoption of straight vehicle bodies in medium-speed and high-speed passenger trains is gradually reduced, and drum-shaped vehicle bodies become the mainstream. The mounting methods of under-vehicle equipment and apron board are changed as the original structure cannot meet the requirements.

Most existing railway passenger train underframe boundary beams adopt the channel steel 18b-Q235B. A plurality of cross beams is arranged between two boundary beams. Two ends of the inner cross beam of the bolster are 30 mm higher than the middle to lay a corrugated floor with the thickness of 30 mm, and the cross beams are inserted into the boundary beam channel to be welded such that the processing difficulty and the assembly difficulty are high. The outer cross beam of the bolster is 30 mm higher than the inner cross beam of the bolster, the weight is increased, and a flat floor is laid on it. The corrugated floor in the bolster and the flat subway outside the bolster are lapped on the outer side of the upper wing face of the boundary beam to be fully welded, and the lower face of the corrugated floor is tacked with the boundary beam. The mounting of the under-vehicle equipment adopts cross beam hanging, and the bracket is welded on the cross beam. A plurality of mounting seats is welded on the underframe boundary beam for mounting the apron board. The channel is formed in the upper end of the outer side face of the boundary beam, and the side wall plate is lapped and welded to it and then ground flat such that the flatness of the side wall is improved. The lower end of the side wall stand column is welded to the outer side of the upper wing face of the boundary beam, the stand column is in a hat shape or a B shape, the height size of the section is 70 mm, the lower end is provided with a seam allowance to avoid the interference with the floor, and the processing workload of the stand column is increased; the lower end of the stand column is welded to the floor, and fatigue stress of the stand column and the floor near the welding seam is increased.

The underframe boundary beam with the channel steel of the form is only suitable for a straight vehicle body, and as the height size of the channel steel is small, it is not suitable for boundary beam hanging, and the mounting of under-vehicle equipment is complex; the cross beam section is a variable section such that the processing difficulty and the assembly difficulty are high; the section of the outer cross beam of the bolster is large, the section of the inner cross beam of the bolster close to the side of the boundary beam is large, the weight is heavy, and the lightweight of a vehicle body is not facilitated. The lower end of the stand column is provided with a seam allowance such that the processing volume is increased; the lower end of the stand column is welded to the floor, and fatigue stress of the stand column and the floor near the welding seam is increased.

After document retrieval, it is found that the Chinese utility model CN 207481901 U discloses an underframe boundary beam of a vehicle body, wherein the boundary beam is a bending piece for making the boundary beam and doorsill into an integrated structure through cold roll forming. Instead of fixing the boundary beam and the doorsill through welding in the prior art, the integral vertical rigidity and strength of the boundary beam are improved. The underframe boundary beam is only suitable for underframes with doorsills and has no interface with a side wall.

SUMMARY

The object of the invention is mainly to solve the problems in the prior art, and provides an underframe boundary beam connecting structure suitable for a railway vehicle with a drum-shaped vehicle body such that the mode for hanging the under-vehicle equipment boundary beam is realized. The problem of large fatigue stress at the joint of a side wall stand column and the floor is solved; the processing difficulty and assembling difficulty of the cross beam are reduced; and the weight of the vehicle body is reduced.

In order to solve the technical problems, the invention provides an underframe boundary beam connecting structure suitable for a railway vehicle with a drum-shaped vehicle body, comprising an underframe boundary beam, an underframe cross beam, a side wall stand column, a side wall plate, and an under-vehicle equipment bracket, characterized in that the underframe boundary beam is a roll bending piece, a section thereof being of a channel structure, and has a side face, an upper wing face and a lower wing face, wherein the side face has an inclination angle consistent with the side wall plate, an upper end of an outer side of the side face is provided with a concave platen, and the side wall plate is lapped on the platen and fixed by butt welding; an inner end of the lower wing face is provided with a downwards vertical flanging, a vertical plate is welded and fixed between the upper wing face and the lower wing face, and an inner side face of the vertical plate is coplanar with the inner side face of the vertical flanging and serves as a mounting face of the under-vehicle equipment bracket; an upper plane of the underframe cross beam is flush with the upper wing face of the underframe boundary beam, and two ends of the underframe cross beam are welded and fixed with the inner surface of the side face of the underframe boundary beam.

The invention also discloses an underframe structure for a railway vehicle with a drum-shaped vehicle body, characterized by having the underframe boundary beam connecting structure suitable for a railway vehicle with a drum-shaped vehicle body In addition, the invention also sets forth a railway vehicle, characterized by having the underframe boundary beam connecting structure suitable for a railway vehicle with a drum-shaped vehicle body.

The invention has beneficial effects as follows.

The invention provides a boundary beam suitable for a drum-shaped sectional steel vehicle body underframe and a connecting structure of the boundary beam and surrounding components and parts; the mounting mode of the under-vehicle equipment boundary beam hanging is realized; the flatness of the side wall is improved; the fatigue stress at the joint of the side wall stand column and the floor is reduced; and a simple side apron board mounting structure is provided. The invention can provide references or examples for a drum-shaped steel vehicle body of railway passenger vehicles or motor train units of 160 km/h or more.

Figure 1:
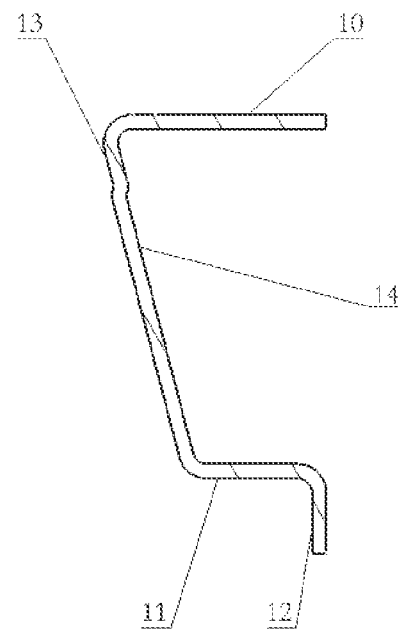
FIG. 1 is a schematic sectional view of an underframe boundary beam according to the present invention.

Reference numerals in the drawings are illustrated as follows: 1—underframe boundary beam, 2—vertical plate, 3—underframe cross beam, 4—floor, 5—side wall stand column, 6—side wall plate, 7—under-vehicle equipment bracket, 8—apron board mounting beam, 9—threaded block, 10—upper wing face, 11—lower wing face, 12—vertical flanging, 13—platen, and 14—side face.

DETAILED DESCRIPTION OF THE EMBODIMENTS

Preferred embodiments of the present invention will be described in detail below with reference to the accompanying drawings.

Figure 2:
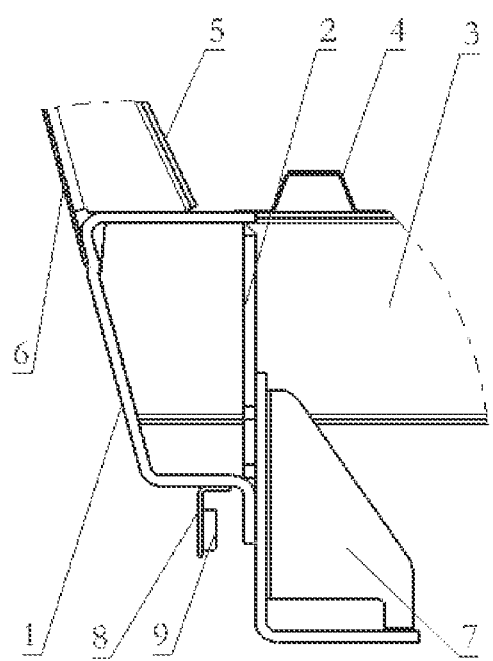
FIG. 2 is a schematic view showing a connecting structure of an underframe boundary beam according to the present invention.

As shown in FIGS. 1 and 2, the embodiment is suitable for underframe boundary beam connecting structure of a railway vehicle with a drum-shaped vehicle body, mainly comprising an underframe boundary beam 1, an underframe cross beam 3, a side wall stand column 5, a side wall plate 6, an under-vehicle equipment bracket 7, and an underframe floor 4. The section of the underframe boundary beam 1 has a channel-shaped structure, the height size thereof is large, and the lower wing face 11 is provided with a vertical flanging 12 downwards such that connecting strength of the under-vehicle equipment bracket 7 and the underframe boundary beam 1 is improved, and meanwhile, the vertical rigidity and the bending resistance of the underframe boundary beam 1 are improved; the side face 14 of the underframe boundary beam 1 is provided with an outwardly inclined angle, and the inclination angle is consistent with the side wall; a platen 13 is provided at the upper end of the outer side of the side face 14, and the side wall plate 6 is lapped on the platen 13 for butt welding and is ground flat after welding to ensure the flatness of the lower end of the side wall. A vertical plate 2 is provided in the underframe boundary beam 1 at the under-vehicle equipment bracket 7, the vertical plate 2 is respectively welded to the upper wing face 10 and the lower wing face 11 of the underframe boundary beam 1 up and down to improve the bending resistance performance of the underframe boundary beam 1, and the front end and rear end of the vertical plate 2 are welded to the underframe cross beam 13. The inner surface and the outer surface of the vertical plate 2 are coplanar with the inner side face of the vertical flanging 12 of the boundary beam lower wing face 11 such that a mounting face is provided for welding the under-vehicle equipment bracket 7, and the under-vehicle equipment boundary beam hanging mode is realized; the vertical plate 2 is provided with an oblong fabrication hole such that the weight is reduced, and convenience is provided for anticorrosive spraying of a vehicle body.

The underframe cross beam 3 includes a bolster inner cross beam and a bolster outer cross beam, the sections of the two are consistent, the upper plane of the underframe cross beam 3 is flush with the upper surface of the upper wing face 10 on the underframe boundary beam 1, and the section is uniform and easy to form. The height size of the section of the underframe cross beam 3 is smaller than the height size of the channel shape of the underframe boundary beam such that the cross beam and the boundary beam can be easily assembled. The underframe floor 4 includes an inner bolster floor and an outer bolster floor, both of the two adopting corrugated floor. The underframe floor 4 is welded to the upper plane of the underframe cross beam 3 below, and two sides of the underframe floor 4 are welded to the underframe boundary beam 1. The width of the upper wing face 10 of the underframe boundary beam 1 is larger than that of the section of the side wall stand column 5. The lower end of the side wall stand column 5 is welded to the upper wing face 10 of the boundary beam such that it is prevented from falling on the corrugated floor, and the fatigue stress is small. The side wall plate 6 is lapped on the platen 13 on the outer side of the underframe boundary beam in a butt welding mode, and is ground flat after welding such that the flatness of the lower end of the side wall is guaranteed. The under-vehicle equipment bracket 7 is welded to the vertical flanging 12 of the lower wing face 11 of the underframe boundary beam 1 and the vertical plate 2. An angle apron board mounting beam 8 is welded on the lower wing face 11 of the underframe boundary beam 1, and a square threaded block 9 is welded in the apron board mounting beam 8 for mounting a side apron board through a bolt. The horizontal plane of the apron board mounting beam is welded to the lower wing face of the boundary beam, and its direction is towards the vertical flange of the lower wing face of the boundary beam such that the side apron board can be conveniently mounted.

In the embodiment, the underframe boundary beam 1 is of a channel section, the width size of the upper wing face 10 of the boundary beam is 132 mm, the width size of the lower wing face 11 of the boundary beam is 80 mm, the height size of the side face is 204 mm, the size of the downwards vertical flanging 12 of the lower wing face is about 50 mm, the side face is inclined outwards by about 15°, the inclination is consistent with that of the side wall, the upper end of the outer side is provided with a 2.7 mm×40 mm platen 13, and the thickness of the boundary beam is 8 mm. A vertical plate 2 with the thickness of 8 mm is provided in the underframe boundary beam 1 at a position with the under-vehicle equipment bracket 7. The outer surface is flush with the vertical flanging 12 of the lower wing face of the boundary beam and is welded to the inner face 13 of the upper wing face of the boundary beam and the inner face 15 of the lower wing face of the boundary beam, and two ends are welded to the underframe cross beam 4; the vertical plate 2 is formed with an oblong hole of 50 mm×100 mm. The underframe cross beams 3 are all of the same channel section, the height size is 158 mm, the upper plane is flush with the upper wing face 10 of the underframe boundary beam, and two ends of the underframe cross beam 3 are welded to the inner face of the side face 14 of the boundary beam. The inner side and the outer side of the bolster are respectively provided with a corrugated floor, they are located on the upper plane of the cross beam 3, and the two sides are lapped by 15 mm and welded to the upper wing face of the underframe boundary beam. The section of the side wall stand column 5 is B-shaped, and the section of the lower end has a height of 85 mm, and is welded to the upper wing face of the underframe boundary beam. The side wall plate 6 is lapped on the platen 12 on the outer side of the underframe boundary beam in a butt welding mode, and is ground flat after welding. The under-vehicle equipment bracket 7 is welded on the vertical plate 3 and the vertical flanging 12 of the lower wing face of the underframe boundary beam. An angle apron board mounting beam 8 is welded on the lower wing face 11 of the boundary beam, the section size is 3 mm×25 mm×50 mm. A square thread block 9 with the size of 10 mm×30 mm×40 mm is welded in the apron board mounting beam 8 for mounting the side apron board through a bolt.

In addition to the embodiments described above, other preferred embodiments of the invention are possible. All technical schemes formed by equivalent replacements or equivalent transformations fall within the scope of the present invention.

What is claimed is:

1. An underframe boundary beam connecting structure suitable for a railway vehicle with a drum-shaped vehicle body, comprising an underframe boundary beam, an underframe cross beam, a side wall stand column, a side wall plate, and an under-vehicle equipment bracket, wherein
   the underframe boundary beam is a roll bending piece, a section of the underframe boundary beam is of a channel structure, and
   the underframe boundary beam has a side face, an upper wing face and a lower wing face, wherein
      the side face has an inclination angle consistent with the side wall plate,
      an upper end of an outer side of the side face is provided with a concave platen, and
      the side wall plate is lapped on the concave platen and fixed by a butt welding;
      an inner end of the lower wing face is provided with a downwards vertical flanging,
      a vertical plate is welded and fixed between the upper wing face and the lower wing face, and
      an inner side face of the vertical plate is coplanar with an inner side face of the downwards vertical flanging and serves as a mounting face of the under-vehicle equipment bracket;
      an upper plane of the underframe cross beam is flush with the upper wing face of the underframe boundary beam, and
      two ends of the underframe cross beam are welded and fixed with an inner surface of the side face of the underframe boundary beam.

2. The underframe boundary beam connecting structure according to claim 1, wherein a front end and a rear end of the vertical plate are welded to the underframe cross beam.

3. The underframe boundary beam connecting structure according to claim 1, wherein the vertical plate is formed with an oblong fabrication hole.

4. The underframe boundary beam connecting structure according to claim 1, wherein an underframe floor is a corrugated floor and is welded to the upper plane of the underframe cross beam, and two sides of the underframe floor are welded to the upper wing face of the underframe boundary beam.

5. The underframe boundary beam connecting structure according to claim 1, wherein a width of the upper wing face of the underframe boundary beam is larger than a width of a section of the side wall stand column, and a lower end of the side wall stand column is welded to the upper wing face of the underframe boundary beam.

6. The underframe boundary beam connecting structure according to claim 1, wherein the under-vehicle equipment bracket is welded on the downwards vertical flanging of the lower wing face of the underframe boundary beam and the vertical plate.

7. The underframe boundary beam connecting structure according to claim 1, wherein an angle apron board mounting beam is welded on the lower wing face of the underframe boundary beam, and a square threaded block is welded in the angle apron board mounting beam for mounting a side apron board through a bolt.

8. An underframe structure, comprising the underframe boundary beam connecting structure suitable for the railway vehicle with the drum-shaped vehicle body according to claim 1.

9. The underframe structure according to claim 8, wherein a front end and a rear end of the vertical plate are welded to the underframe cross beam.

10. The underframe structure according to claim 8, wherein the vertical plate is formed with an oblong fabrication hole.

11. The underframe structure according to claim 8, wherein a height size of a section of the underframe cross beam is smaller than a height size of the section of the underframe boundary beam.

12. The underframe structure according to claim 8, wherein an underframe floor is a corrugated floor and is welded to the upper plane of the underframe cross beam, and two sides of the underframe floor are welded to the upper wing face of the underframe boundary beam.

13. The underframe structure according to claim 8, wherein a width of the upper wing face of the underframe boundary beam is larger than a width of a section of the side wall stand column, and a lower end of the side wall stand column is welded to the upper wing face of the underframe boundary beam.

14. The underframe structure according to claim 8, wherein the under-vehicle equipment bracket is welded on the downwards vertical flanging of the lower wing face of the underframe boundary beam and the vertical plate.

15. The underframe structure according to claim 8, wherein an angle apron board mounting beam is welded on the lower wing face of the underframe boundary beam, and a square threaded block is welded in the angle apron board mounting beam for mounting a side apron board through a bolt.

16. A railway vehicle, comprising the underframe boundary beam connecting structure suitable for the railway vehicle with the drum-shaped vehicle body according to claim 1.

17. The railway vehicle according to claim 16, wherein a front end and a rear end of the vertical plate are welded to the underframe cross beam.

18. The railway vehicle according to claim 16, wherein the vertical plate is formed with an oblong fabrication hole.

19. The railway vehicle according to claim 16, wherein a height size of a section of the underframe cross beam is smaller than a height size of the section of the underframe boundary beam.

20. The underframe boundary beam connecting structure according to claim 1, wherein a height size of a section of the underframe cross beam is smaller than a height size of the section of the underframe boundary beam.

\* \* \* \* \*